(12) United States Patent
Stöter et al.

(10) Patent No.: US 7,226,044 B2
(45) Date of Patent: Jun. 5, 2007

(54) ROLLING-LOBE AIR SPRING

(75) Inventors: Bernd Stöter, Laatzen (DE); Sven Klement, Hannover (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 377 days.

(21) Appl. No.: 10/414,052

(22) Filed: Apr. 16, 2003

(65) Prior Publication Data
US 2005/0280193 A1 Dec. 22, 2005

(30) Foreign Application Priority Data
Apr. 16, 2002 (DE) ................ 102 16 750

(51) Int. Cl.
*F16F 9/05* (2006.01)
(52) U.S. Cl. ............... 267/64.27; 267/35; 267/122
(58) Field of Classification Search ........... 267/64.19, 267/64.23, 64.27, 122, 64.24, 35, 64.21; 280/124.157, 124.158
See application file for complete search history.

(56) References Cited

U.S. PATENT DOCUMENTS

| 4,899,995 | A | * | 2/1990 | Hoffman et al. | ......... 267/64.27 |
| 4,946,144 | A | * | 8/1990 | Geno et al. | ............. 267/64.27 |
| 5,005,808 | A | * | 4/1991 | Warmuth et al. | ........ 267/64.27 |
| 5,374,037 | A | * | 12/1994 | Bledsoe | ................... 267/64.27 |
| 6,386,522 | B2 | * | 5/2002 | Brakmann et al. | ............ 267/27 |
| 6,386,523 | B1 | * | 5/2002 | Crabtree et al. | ............ 267/122 |
| 6,439,550 | B1 | * | 8/2002 | Koch | ...................... 267/64.23 |
| 6,474,630 | B1 | * | 11/2002 | Weitzenhof | .............. 267/64.27 |
| 6,651,995 | B1 | * | 11/2003 | Buttner | ................ 280/124.157 |
| 6,921,065 | B2 | * | 7/2005 | Oldenettel et al. | ....... 267/64.27 |

FOREIGN PATENT DOCUMENTS

| DE | 3643073 A1 | * | 6/1988 |
| DE | 1004056517 A1 | * | 6/2006 |
| EP | 0 548 581 | | 1/1996 |
| JP | 62167943 A | * | 7/1987 |

* cited by examiner

*Primary Examiner*—Thomas Williams
(74) *Attorney, Agent, or Firm*—Walter Ottesen

(57) ABSTRACT

An air spring includes a flexible member, a roll-off piston and a cover plate. The piston includes a slot at its upper end for receiving the end of the flexible member applied with the aid of a clamp ring. The piston includes a flange for deflecting the flexible member. The outer diameter of the flange corresponds approximately to the outer diameter of the clamp ring and the roll-off diameter of the piston. The flexible member is tapered at its lower region to avoid an uncontrollable collapse in the pressureless state of the air spring or a sharp snap-in of the flexible member exiting from the attachment. The flexible member exits at approximately 90° in the radial direction from the attachment. The peripheral slot and the flange are so configured that, in the pressureless state, a clear diameter jump is present between clamping diameter and diameter of the remainder of the flexible member.

13 Claims, 3 Drawing Sheets

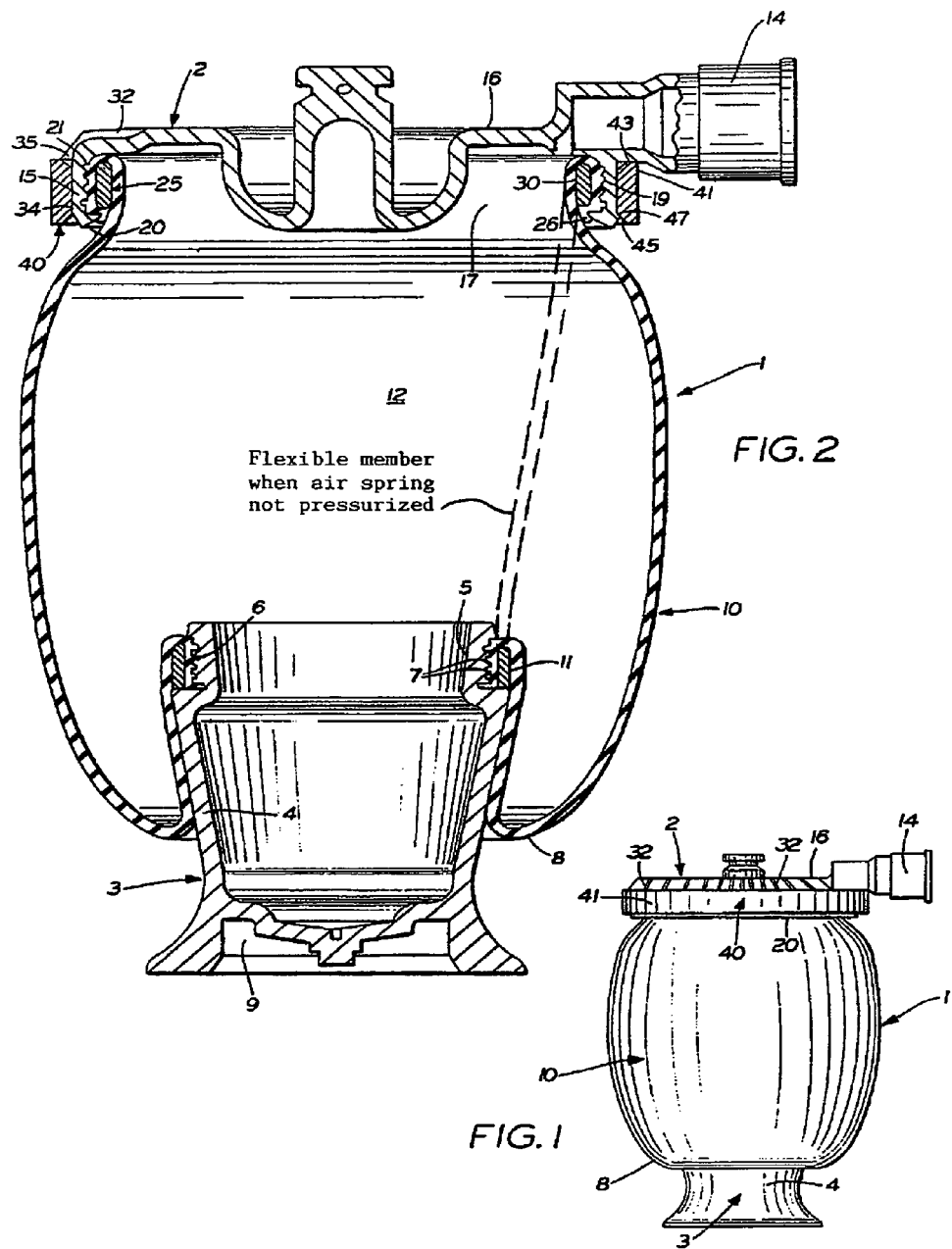

ROLLING-LOBE AIR SPRING

BACKGROUND OF THE INVENTION

A conventional tube-shaped flexible member has a cylindrical wall which is axially attached to a roll-off piston. All air springs incorporating this type of flexible member function only when they are charged with pressure. A roll off of the flexible member on the roll-off piston is not possible in the pressureless state. A pressureless state can, for example, occur during maintenance work. If a vehicle is raised on a lift, the air springs are stretched because they are relieved of the weight of the vehicle and are pulled by the weight of the axles. If the vehicle is then again set down with pressureless air springs, an uncontrollable collapse takes place with conventional tubular-shaped flexible members and this collapse can lead to damage or even destruction of the air spring.

European patent publication 0,548,581 discloses an air spring having a tubular-shaped flexible member wherein the flexible member is not clamped axially as usually but is radially aligned as best shown, for example, in FIGS. 1 and 4 of this publication. The radial alignment of the flexible member attachment affords the advantage that only a 90° redirection is required for the roll-off operation. The exit out of the clamped region transversely to the axis viewed by itself is not a condition precedent for a pressureless roll off. Viewed further, FIG. 1 of European patent publication 0,548,581 does very effectively illustrate the subject matter (pressureless: solid lines; charged with pressure: broken lines). In the pressureless state (solid lines), there results a sharp bend of the flexible member extending radially out from the attachment. A trouble-free roll off of the flexible member on the piston wall is not ensured when there is a pressureless collapse of the air spring.

SUMMARY OF THE INVENTION

It is an object of the invention to eliminate the situation given especially in the pressureless state. It is also an object of the invention to provide a trouble-free roll off of the flexible member on the piston wall also in the pressureless state.

The rolling-lobe air spring of the invention includes: a cover plate; a roll-off piston; a rolling-lobe flexible member having a first end connected to the cover plate and a conically tapered lower portion terminating in a second end; the roll-off piston having a peripherally extending slot formed in the upper end portion thereof for receiving the second end therein; a clamp ring seated outside on the second end for attaching the second end pull-tight and pressure-tight to the roll-off piston in the slot; the roll-off piston having a flange on the upper end portion thereof in spaced relationship to the clamp ring so as to deflect the lower end portion and permit the lower portion of the flexible member to extend outwardly between the clamp ring and the flange; and, the flange, the clamp ring and the conically-tapered lower portion being elements conjointly defining a clamping region and the elements being arranged and configured so as to cause the lower portion to exit from the clamping region approximately radially including in the pressureless state of the air spring.

The above object of the invention is achieved essentially by coupling two features, namely, a tapered end portion of the flexible member to be clamped on the roll-off piston and via a radial exiting of the flexible member from its attachment at the roll-off piston. With the coupling of these two features, it is ensured that the radial orientation at the attachment location is provided even in the pressureless state so that the flexible member can be deflected in an unhindered manner to both sides.

The flexible member has, at least at its attachment end, a preferably conical tapering. The clamp region is provided with a smaller diameter while the remaining body of the flexible member has a larger diameter with a cylindrical configuration. Because of the special type of clamping at the roll-off piston end, the deflection of the flexible member is only approximately 90°. The outer diameter of the flange disposed at the piston end corresponds approximately to the roll-off diameter of the piston. Furthermore, the outer diameter of the flange corresponds approximately to the outer diameter of the clamped clamp ring. The peripherally-extending recess (clamping region) and the flange are so configured that already in the pressureless state, a clear lump in diameter between the clamp region diameter and the remaining diameter of the flexible member is present.

The diameter difference of flexible member and roll-off piston is approximately equal to eight times the wall thickness of the flexible member. The wall thickness of the flexible member is approximately 1.5 to 6 mm, that is, $D_D - D_K \approx 12$ to 48 mm.

The conical region of the flexible member is less than twice the diameter difference of the flexible member and the roll-off piston, that is: $L_U < 24$ to 96 mm.

The product of flexible member diameter and flexible member wall thickness is greater than the cylindrical flexible member length, that is: $L_{cyl} < 1.5\ D_D$ to $6\ D_D$ (mm).

Compared to the above-mentioned state of the art, a more favorable roll-off performance is achieved with the air spring of the invention especially for the pressureless air spring. With the application of force to the roll-off piston, a pressureless folding while maintaining a small roll-off radius is possible. A buckling of the flexible member during a pressureless roll up is avoided.

BRIEF DESCRIPTION OF THE DRAWINGS

The invention will now be described with reference to the drawings wherein.

DESCRIPTION OF THE PREFERRED EMBODIMENTS OF THE INVENTION

The tube-shaped flexible member 4 according to the invention has no bead at the end thereof as is usual with such flexible members. In this way, it is possible to manufacture flexible members as sections of a continuous tubular or hose-shaped element. While conventional flexible members are configured to be purely cylindrical, the flexible resilient member 4 of the invention has an approximately conical taper (conical region 32) facing toward the roll-off piston. The taper is already imparted in the untensioned pressureless state. The upper region 18 of the flexible member 4 is cylindrical as in conventional flexible members.

Figure 2:
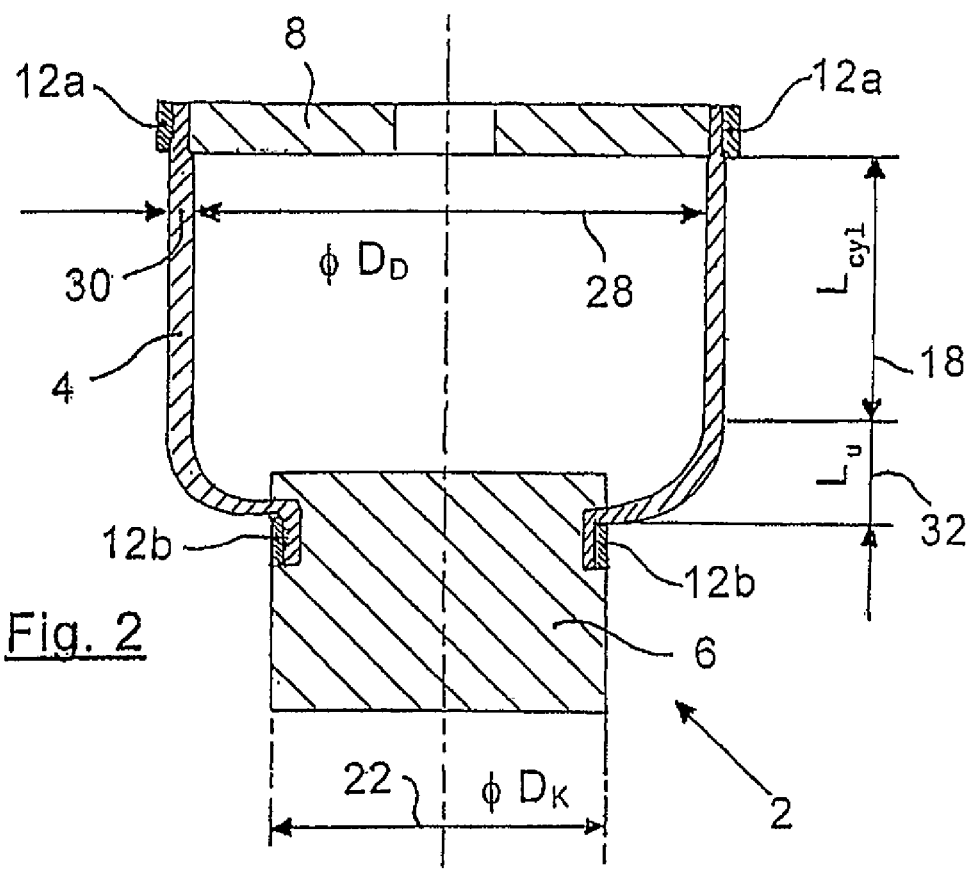
FIG. 2 is a side elevation view, in section, through an air spring of the invention for the pressureless state.
Figure 3:
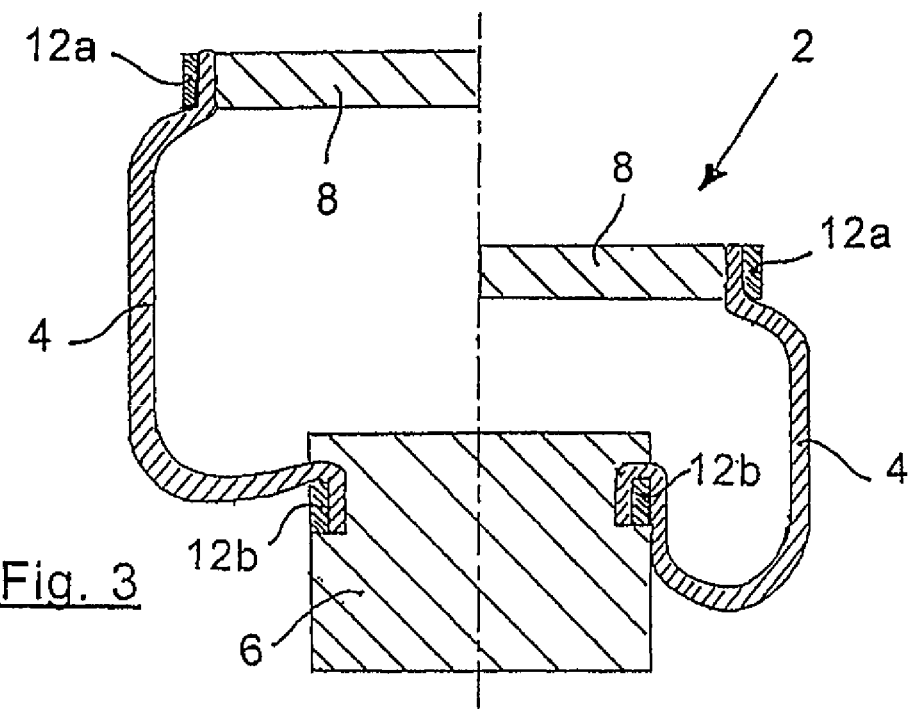
Figure 4:
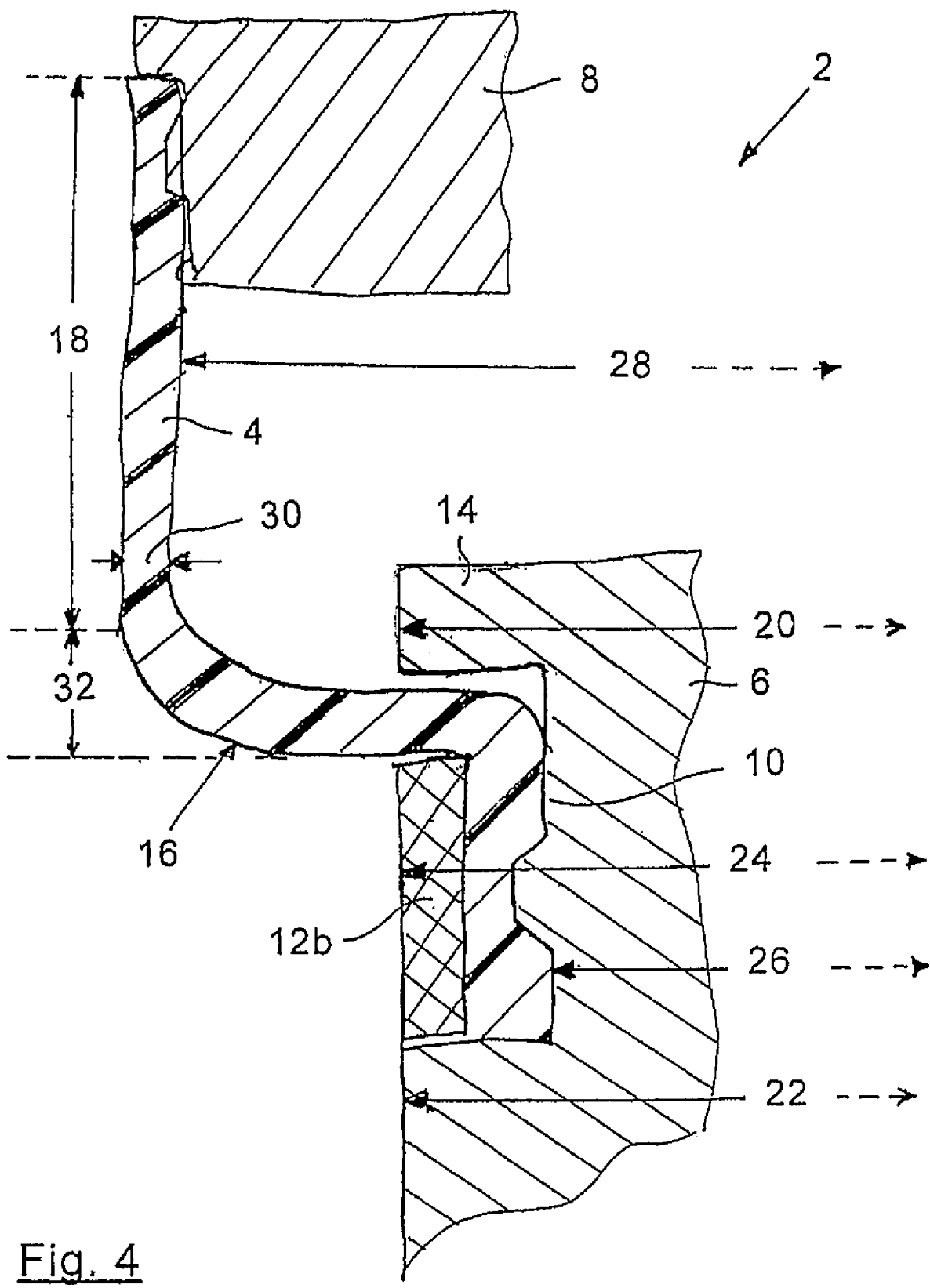

FIG. 2 shows the same flexible member 4 but in a mounted or built-in state, that is, as part of an air spring 2. At its upper end, the flexible member 4 is clamped by a first clamp ring 12a to a cover 8 and, at its lower end, the resilient member is clamped with a second clamp ring 12b pressure-tight to a roll-off piston 6. The tapered configuration and the type of clamping at the roll-off piston 6 have the consequence that the flexible member 4 leaves the clamping location on the roll-off piston 6 at a quasi-right angle. The reference character $L_{cyl}$ identifies the cylindrical region 18 of the resilient member 4 while reference character $L_U$ identifies the axial length of the approximately conical region 32. $D_D$ is the diameter of the cylindrical region 18 and $D_K$ is the diameter of the roll-off piston 6. Reference numeral 30 identifies the wall thickness of the flexible member 4.

Figure 3:
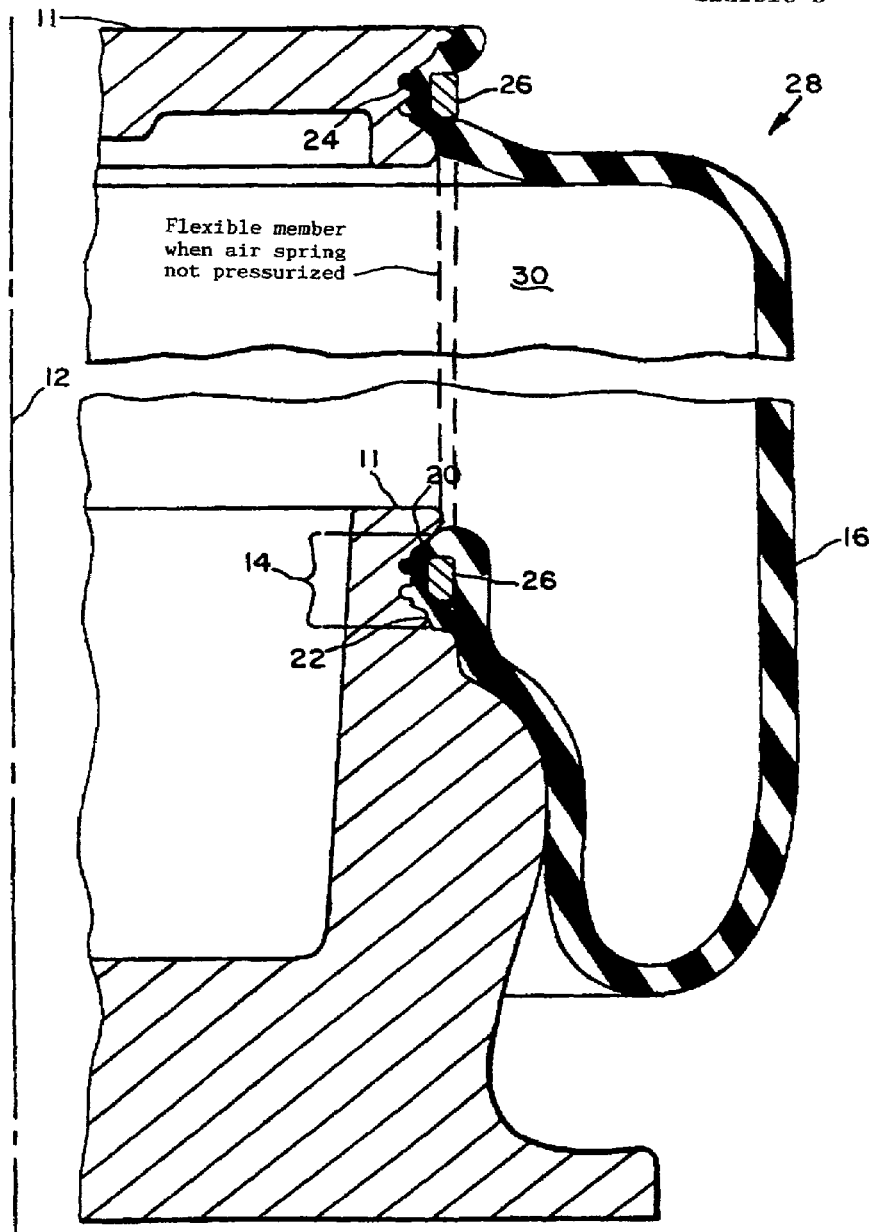
FIG. 3 is a side elevation view, in longitudinal section, through an air spring under operational pressure with the left-hand side showing the rest position and the right-hand side showing the deflected state wherein a rolling lobe has formed; and, FIG. 4 is a detail side elevation view, in section, of the section view shown in FIG. 2.

FIG. 3 shows the same basic configuration of an air spring 2 comprising a cover plate 8, flexible member 4 and roll-off piston 6. By charging the air spring 2 with compressed air, the flexible member 4 is expanded correspondingly outward (left-hand side). The right-hand side of FIG. 3 shows the pressure-charged air spring 2 in the deflected state.

Figure 4:
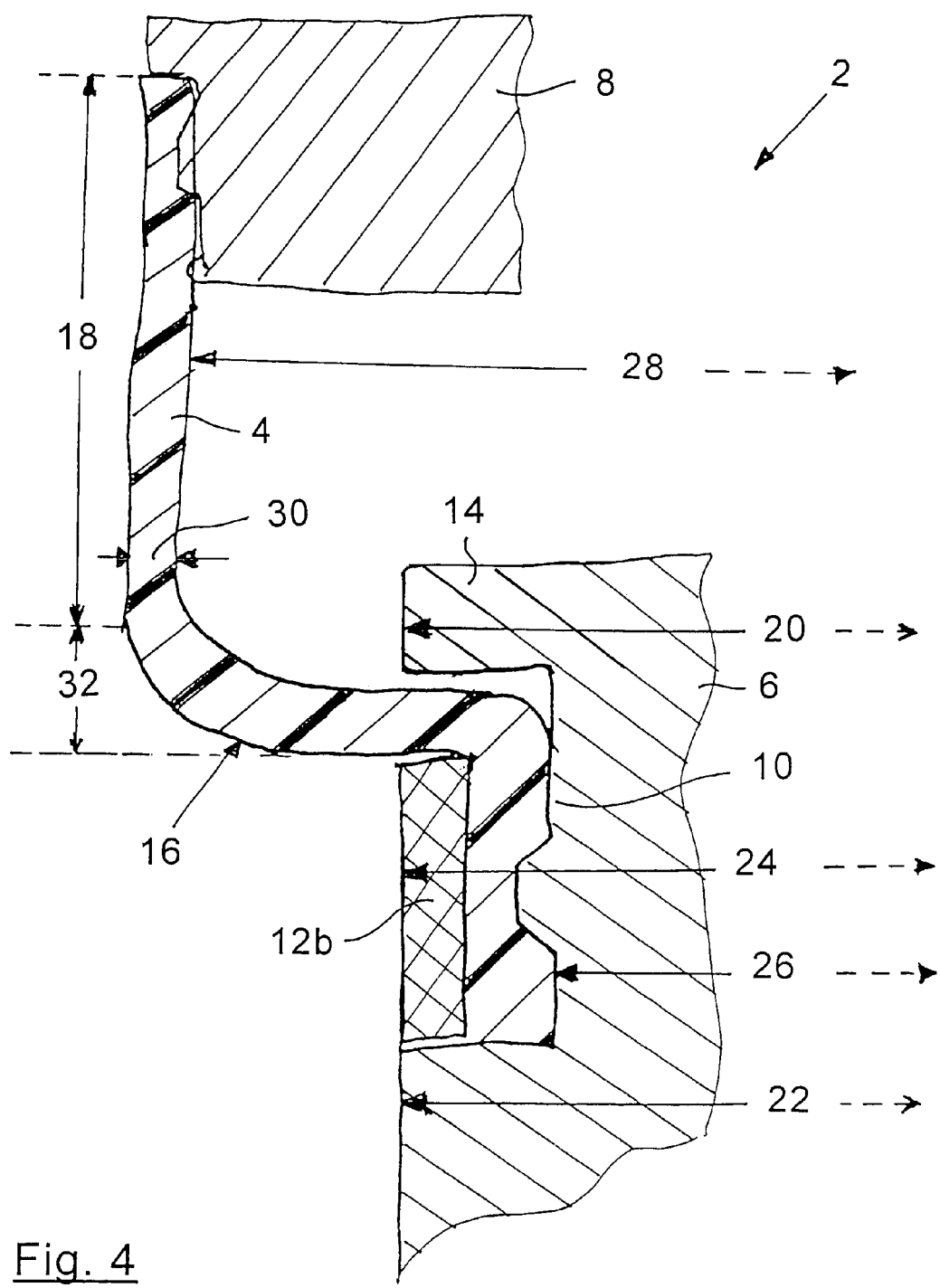

The two essential details of the invention are presented in FIG. 4. Here, the taper of the lower region 32 of the resilient member is shown as is the type of clamping of the resilient member 4 on the roll-off piston 6.

Figure 1:
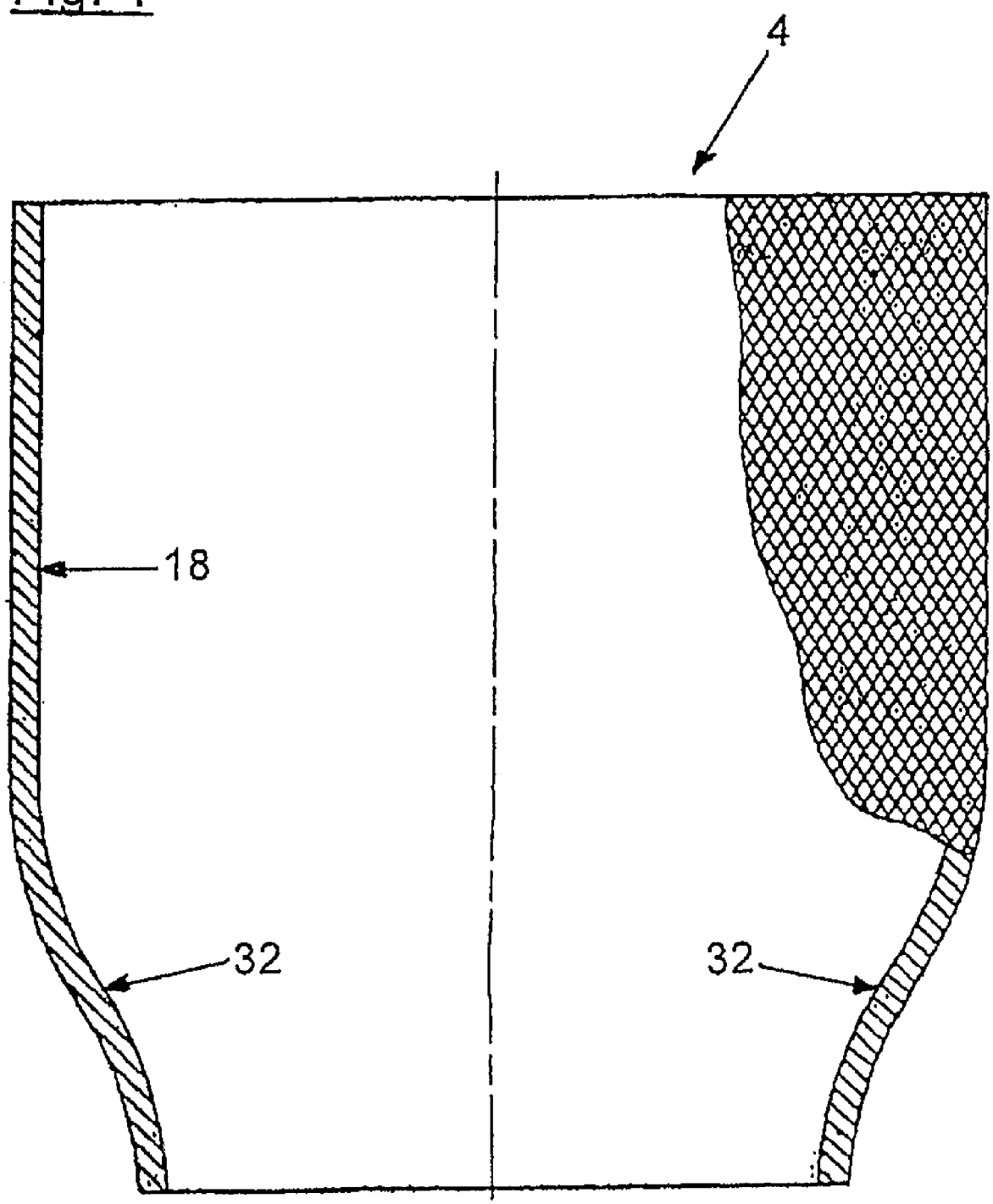
FIG. 1 is a side elevation view, partially in section, of a tube-shaped flexible resilient member shown partially in longitudinal section.

As explained with respect to FIG. 1, the upper region 18 of the flexible member 4 is configured so as to be cylindrical and is identified by $L_{cyl}$. The approximately conical transition region 32 (dimension $L_U$) extends downwardly from the cylindrical region 18. At its upper end, the flexible resilient member 4 is clamped pressure-tight by a clamp ring 12a to the upper cover plate 8. The lower end of the flexible resilient member 4 is mounted pressure-tight and pull-tight by a clamp ring 12b to the roll-off piston 6. For the purpose of attachment of the flexible member 4, the roll-off piston 6 has a peripherally extending groove or slot 10 at its upper end.

This slot 10 receives the lower end of the flexible member 4 on which the clamp ring 12b is seated and is pressed together on all sides. The peripherally-extending slot 10 is delimited by a flange 14 which defines the upper edge of the roll-off piston 6. The outer diameter 20 of the flange 14 corresponds approximately to the outer diameter 24 of the clamp ring 12b and furthermore, to the roll-off diameter ($D_K$) 22 of the piston 6. The peripherally-extending slot (clamping region) 10 and the flange 14 are so configured that already in the pressureless state, a clear diameter jump is present between the cylindrical diameter ($D_D$) 28 of the cylindrical region 18 of the flexible member and the diameter 26 in the clamping region of the flexible member 4 on the piston 6 whereby the end of the flexible member, which is clamped by means of clamp ring 12b, is deflected by 90° and is directed outwardly in a radial direction.

It is understood that the foregoing description is that of the preferred embodiments of the invention and that various changes and modifications may be made thereto without departing from the spirit and scope of the invention as defined in the appended claims.

What is claimed is:

1. A rolling-lobe air spring defining a longitudinal axis and comprising:
   a cover plate;
   a roll-off piston having an upper end portion;
   a rolling-lobe flexible member having a first end connected to said cover plate and a conically tapered lower portion terminating in a second end;
   said roll-off piston having a peripherally extending slot formed in said upper end portion thereof for receiving said second end therein;
   a clamp ring seated outside on said second end for attaching said second end pull-tight and pressure-tight to said roll-off piston in said slot;
   said roll-off piston having a flange on said upper end portion thereof in spaced relationship to said clamp ring and at least partially overlapping said clamp ring so as to deflect said lower end portion and permit said lower portion of said flexible member to extend outwardly between said clamp ring and said flange; and,
   said flange, said clamp ring and said conically-tapered lower portion being elements conjointly defining a clamping region and said elements being arranged and configured so as to cause said lower portion of said flexible member to exit radially from between said flange and said clamp ring at said clamping region at an angle of approximately 90° referred to said longitudinal axis including when said air spring is in the pressureless state.

2. The rolling-lobe air spring of claim 1, wherein said flange has a diameter substantially equal to the outer diameters of said clamp ring and said roll-off piston.

3. The rolling-lobe air spring of claim 1, wherein said flexible member has an upper portion extending from said conically-tapered lower portion and terminating in said first end at said cover plate and said upper portion of said flexible member has a first diameter ($D_D$) when said air spring is in the pressureless state; said peripherally extending slot has a base and said base defines a second diameter; and, said peripherally extending slot and said flange are so configured that, in the pressureless state, there is a clear jump in diameter between said first diameter ($D_D$) and said second diameter.

4. The rolling-lobe air spring of claim 3, wherein said roll-off piston has a third diameter ($D_K$); and, the difference ($D_D$–$D_K$) between said first diameter ($D_D$) of said flexible member and said third diameter ($D_K$) is approximately equal to 8 times the wall thickness of said flexible member.

5. The rolling-lobe air spring of claim 4, wherein said wall thickness lies in a range of approximately 1.5 to 6 mm and said difference ($D_D$–$D_K$) lies in a range of 12 to 48 mm.

6. The rolling-lobe air spring of claim 4, wherein said rolling-lobe air spring defines a longitudinal axis; said conically-tapered lower portion of said flexible member has a first length ($L_u$) measured along said longitudinal axis; and, said length ($L_u$) is less than twice said difference ($D_D$–$D_K$).

7. The rolling-lobe air spring of claim 4, wherein said rolling-lobe air spring defines a longitudinal axis; said conically-tapered lower portion of said flexible member has a first length ($L_u$) measured along said longitudinal axis; and, said length ($L_u$) is less than 24 mm for a wall thickness of 1.5 mm as a lower limit and less than 96 mm for a wall thickness of 6 mm as an upper limit.

8. The rolling-lobe air spring of claim 4, wherein said upper portion of said flexible member has a second length ($L_{cyl}$) measured along said longitudinal axis; and, the product of said first diameter ($D_D$) and said wall thickness is greater than said second length ($L_{cyl}$) of said upper portion.

9. The rolling-lobe air spring of claim 4, wherein said upper portion of said flexible member has a second length ($L_{cyl}$) measured along said longitudinal axis; and, said second length ($L_{cyl}$) is less than 1.5 $D_D$ to 6 $D_D$.

10. A rolling-lobe air spring defining a longitudinal axis and comprising:

a cover plate;

a roll-off piston having an upper end portion;

a rolling-lobe flexible member having a first end connected to said cover plate whereat said flexible member has a first diameter and having a lower portion terminating in a second end whereat said flexible member has a second diameter less than said first diameter;

said flexible member being tapered to provide a clear change in diameter in said lower portion to said second diameter when said air spring is in a pressureless state;

said roll-off piston having an outer diameter and having a peripherally extending slot formed in said upper end portion thereof for receiving said second end therein;

a clamp ring having an outer diameter and being seated outside on said second end of said flexible member for attaching said second end pull-tight and pressure-tight to said roll-off piston in said slot;

said roll-off piston having a laterally projecting flange on said upper end portion thereof in spaced relationship to said clamp ring and overlapping substantially all of said clamp ring so as to deflect said lower end portion and permit said lower portion of said flexible member to extend outwardly between said clamp ring and said flange; and, said flange, said clamp ring and said lower portion being elements conjointly defining a clamping region and said lower portion of said flexible member being sandwiched between said flange and said clamp ring so as to cause said lower portion of said flexible member to exit radially from between said flange and said clamp ring at said clamping region at an angle of approximately 90° referred to said longitudinal axis including when said air spring is in the pressureless state; and, said flange having an outer diameter approximately equal to said outer diameter of said roll-off piston and said outer diameter of said clamp ring.

11. A rolling-lobe air spring defining a longitudinal axis and comprising:

a cover plate;

a roll-off piston having an upper end portion;

a rolling-lobe flexible member having a first end connected to said cover plate whereat said flexible member has a first diameter and having a lower portion terminating in a second end whereat said flexible member has a second diameter less than said first diameter;

said flexible member being tapered to provide a clear change in diameter in said lower portion to said second diameter;

a clamp ring having an outer diameter and being seated outside on said second end of said flexible member for attaching said second end pull-tight and pressure-tight to said roll-off piston;

said roll-off piston having a laterally projecting flange on said upper end portion thereof in spaced relationship to said clamp ring so as to deflect said lower end portion and permit said lower portion of said flexible member to extend outwardly between said clamp ring and said flange;

said flange, said clamp ring and said lower portion being elements conjointly defining a clamping region whereat an annular segment of said lower portion of said flexible member is sandwiched between said flange and said clamp ring so as to fix said annular segment at approximately 90° referred to said longitudinal axis thereby causing said lower portion of said flexible member to exit radially from said clamping region at an angle of approximately 90° referred to said longitudinal axis including when said air spring is in the pressureless state; and, the taper in said lower portion of said flexible member being preimparted thereto so as to provide a favorable roll-off of said flexible member and avoid an uncontrollable collapse of said air spring or a sharp snap-in of said flexible member when said air spring is not under pressure.

12. The rolling-lobe air spring of claim 11, wherein said roll-off piston has an outer diameter and has a peripherally extending slot formed in said upper end portion thereof for receiving said second end therein; and, said clamp ring attaches said second end pull-tight and pressure-tight to said roll-off piston in said slot.

13. A rolling-lobe air spring defining a longitudinal axis and comprising:

a cover plate;

a roll-off piston having an upper end portion;

a rolling-lobe flexible member having a first end connected to said cover plate whereat said flexible member has a first diameter and having a lower portion terminating in a second end whereat said flexible member has a second diameter less than said first diameter;

said flexible member being tapered to provide a clear change in diameter in said lower portion to said second diameter;

a clamp ring having an outer diameter and being seated outside on said second end of said flexible member for attaching said second end pull-tight and pressure-tight to said roll-off piston;

said roll-off piston having a laterally projecting flange on said upper end portion thereof in spaced relationship to said clamp ring so as to deflect said lower end portion and permit said lower portion of said flexible member to extend outwardly between said clamp ring and said flange;

said flange, said clamp ring and said lower portion being elements conjointly defining a clamping region and said lower portion of said flexible member being sandwiched between said flange and said clamp ring so as to cause said lower portion of said flexible member to exit radially from said clamping region at an angle of approximately 90° referred to said longitudinal axis including when said air spring is in the pressureless state;

the taper in said lower portion of said flexible member being preimparted thereto so as to provide a favorable roll-off of said flexible member and avoid an uncontrollable collapse of said air spring or a sharp snap-in of said flexible member when said air spring is not under pressure;

said roll-off piston having an outer diameter and having a peripherally extending slot formed in said upper end portion thereof for receiving said second end therein; and, said clamp ring attaching said second end pull-tight and pressure-tight to said roll-off piston in said slot; and, said flange having an outer diameter substantially equal to said outer diameter of said clamp ring.

* * * * *

UNITED STATES PATENT AND TRADEMARK OFFICE
CERTIFICATE OF CORRECTION

PATENT NO.        : 7,226,044 B2                                    Page 1 of 5
APPLICATION NO.   : 10/414052
DATED             : June 5, 2007
INVENTOR(S)       : Bernd Stoeter and Sven Klement It is certified that error appears in the above-identified patent and that said Letters Patent is hereby corrected as shown below:

On the Title Page :
Please delete the figure on the title page and substitute a copy of FIG. 4 attached hereto therefor.

In the Drawings Sheet 1 of 3 and 2 of 3 :
Please delete FIGS. 1 to 4 and substitute FIGS. 1 to 4 (three sheets) attached hereto.

In column 2 :
Line 17 : delete "lump" and substitute -- jump -- therefor.

Signed and Sealed this

Fourth Day of September, 2007

JON W. DUDAS
*Director of the United States Patent and Trademark Office*

(12) United States Patent
Stöter et al.

(10) Patent No.: US 7,226,044 B2
(45) Date of Patent: Jun. 5, 2007

(54) ROLLING-LOBE AIR SPRING

(75) Inventors: Bernd Stöter, Lautzen (DE); Sven Klement, Hannover (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 377 days.

(21) Appl. No.: 10/414,052

(22) Filed: Apr. 16, 2003

(65) Prior Publication Data
US 2005/0280193 A1 Dec. 22, 2005

(30) Foreign Application Priority Data
Apr. 16, 2002 (DE) .......................... 102 16 750

(51) Int. Cl.
*F16F 9/05* (2006.01)
(52) U.S. Cl. .................. 267/64.27; 267/35; 267/122
(58) Field of Classification Search ........ 267/64.19, 267/64.23, 64.27, 122, 64.24, 35, 64.21; 280/124.157, 124.158
See application file for complete search history.

(56) References Cited

U.S. PATENT DOCUMENTS

| | | | |
|---|---|---|---|
| 4,899,995 A * | 2/1990 | Hoffman et al. | 267/64.27 |
| 4,946,144 A * | 8/1990 | Geno et al. | 267/64.27 |
| 5,005,808 A * | 4/1991 | Warmuth et al. | 267/64.27 |
| 5,374,037 A * | 12/1994 | Bledsoe | 267/64.27 |
| 6,386,522 B2 * | 5/2002 | Brakmann et al. | 267/27 |
| 6,386,523 B1 * | 5/2002 | Crabtree et al. | 267/122 |
| 6,439,550 B1 * | 8/2002 | Koch | 267/64.23 |
| 6,474,630 B1 * | 11/2002 | Weitzenhof | 267/64.27 |
| 6,651,995 B1 * | 11/2003 | Buttner | 280/124.157 |
| 6,921,065 B2 * | 7/2005 | Oldenettel et al. | 267/64.27 |

FOREIGN PATENT DOCUMENTS

| | | | |
|---|---|---|---|
| DE | 3643073 A1 * | 6/1988 | |
| DE | 1004056517 A1 * | 6/2006 | |
| EP | 0 548 581 | 1/1996 | |
| JP | 62167943 A * | 7/1987 | |

* cited by examiner

*Primary Examiner*—Thomas Williams
(74) *Attorney, Agent, or Firm*—Walter Ottesen

(57) ABSTRACT

An air spring includes a flexible member, a roll-off piston and a cover plate. The piston includes a slot at its upper end for receiving the end of the flexible member applied with the aid of a clamp ring. The piston includes a flange for deflecting the flexible member. The outer diameter of the flange corresponds approximately to the outer diameter of the clamp ring and the roll-off diameter of the piston. The flexible member is tapered at its lower region to avoid an uncontrollable collapse in the pressureless state of the air spring or a sharp snap-in of the flexible member exiting from the attachment. The flexible member exits at approximately 90° in the radial direction from the attachment. The peripheral slot and the flange are so configured that, in the pressureless state, a clear diameter jump is present between clamping diameter and diameter of the remainder of the flexible member.

13 Claims, 3 Drawing Sheets

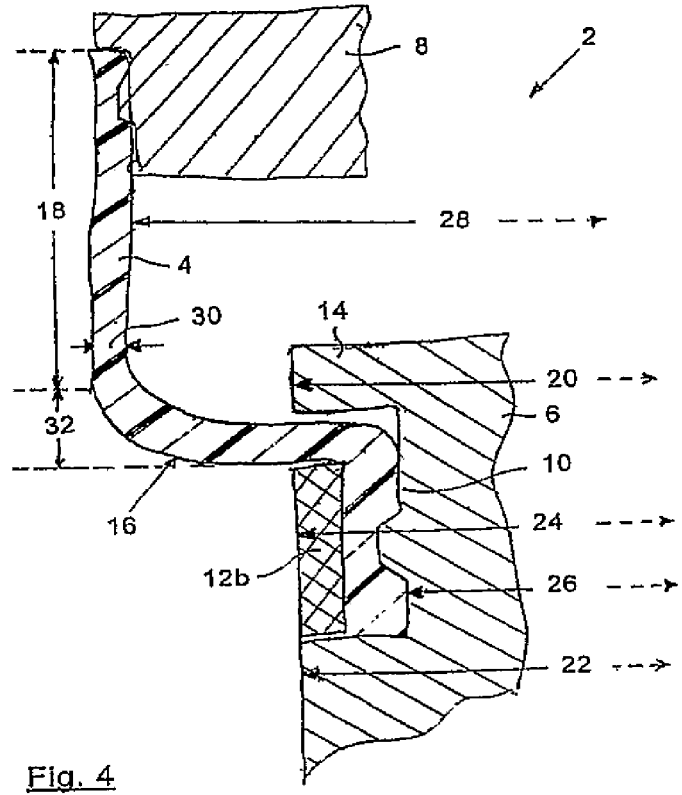

Fig. 4